US 8,200,953 B1

(12) United States Patent
Parsons

(10) Patent No.: US 8,200,953 B1
(45) Date of Patent: Jun. 12, 2012

(54) METHOD AND SYSTEM TO AUTOMATICALLY UPDATE A CONFIGURATION SCHEME

(75) Inventor: Vincent Parsons, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 721 days.

(21) Appl. No.: 12/350,097

(22) Filed: Jan. 7, 2009

(51) Int. Cl.
*G06F 15/177* (2006.01)
(52) U.S. Cl. .................. 713/2; 713/1; 713/100
(58) Field of Classification Search .......... 713/1, 2, 713/100
See application file for complete search history.

(56) References Cited

U.S. PATENT DOCUMENTS

| | | | | |
|---|---|---|---|---|
| 6,055,636 A * | 4/2000 | Hillier et al. | ............ | 726/34 |
| 6,334,121 B1 * | 12/2001 | Primeaux et al. | ............ | 706/62 |
| 6,530,024 B1 * | 3/2003 | Proctor | ............ | 726/23 |
| 7,143,443 B2 * | 11/2006 | Song et al. | ............ | 726/29 |
| 7,461,398 B2 * | 12/2008 | Aaron | ............ | 726/6 |
| 7,546,629 B2 * | 6/2009 | Albert et al. | ............ | 726/1 |
| 7,996,896 B2 * | 8/2011 | Durie | ............ | 726/22 |
| 2002/0095591 A1 * | 7/2002 | Daniell et al. | ............ | 713/200 |
| 2007/0159997 A1 * | 7/2007 | Tsai et al. | ............ | 370/328 |
| 2007/0240220 A1 * | 10/2007 | Tuvell et al. | ............ | 726/24 |
| 2010/0064341 A1 * | 3/2010 | Aldera | ............ | 726/1 |
| 2011/0145640 A1 * | 6/2011 | Hooks | ............ | 714/26 |

* cited by examiner

*Primary Examiner* — Nitin Patel

(74) *Attorney, Agent, or Firm* — Schwegman, Lundberg & Woessner, P.A.

(57) ABSTRACT

A system to automatically update configuration settings based on activities of a user monitored while a training mode is activated is provided. The system may reside at a computer system hosting a computing application and may include a monitoring module and a configuration update module. The monitoring module may be configured to monitor operations or events that invoke a configuration scheme, such as, e.g., a security configuration scheme. The configuration update module may be configured to update the configuration scheme based on monitored operations.

20 Claims, 4 Drawing Sheets

METHOD AND SYSTEM TO AUTOMATICALLY UPDATE A CONFIGURATION SCHEME

TECHNICAL FIELD

This disclosure relates generally to the technical fields of software and/or hardware technology and, in one example embodiment, to system and method to automatically update a configuration scheme.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many computing applications, such as document viewing applications, were initially developed without networking or security capabilities in mind, and thus without particular network security mechanisms. As these applications were enhanced with networking capabilities, such as document sharing, on-line collaboration, and interfacing with remote databases, inherently insecure mechanisms have been incorporated into workflows. As security vulnerabilities were being discovered, these computing applications have been enhanced, now with network security features, such as, for example, a feature preventing access to a server by an electronic document without specific security settings identifying the server as a known network entity. These security restrictions, in some cases, may interfere with existing workflows and may require a user to manually reconfigure security setting.

Some existing computing applications provide a feature that alerts a user whenever a requested operation poses a potential security threat and permits the user to explicitly confirm that such operation is to proceed. In reality, however, a user may not always be in a position to determine with certainty the degree of a potential security threat associated with the requested operation. Consequently, users often respond to the security alerts by simply clicking on the "OK" button presented by the alert window.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
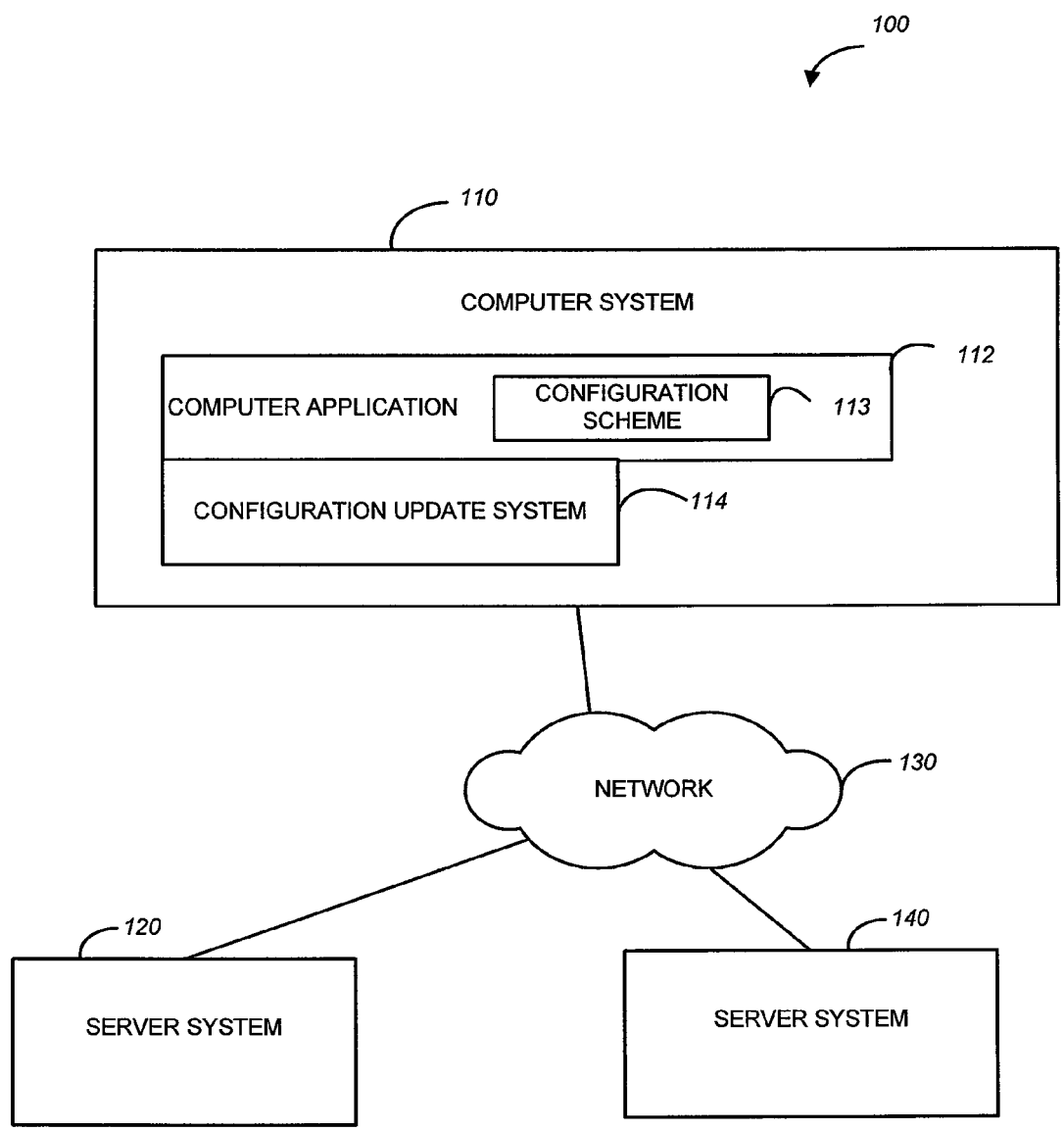
FIG. 1 is a block diagram showing a network environment within which a method and system to automatically update a configuration scheme may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Method and system are proposed to permit running a computing application in a so-called training mode in order to track user's behavior with respect to the computing application and then update the subject configuration scheme according to thus collected data. This approach may be utilized beneficially in a scenario where a computer system has been configured to enforce security restrictions and where it may be useful to fine-tune the associated security configuration scheme, e.g., in order to permit certain workflows to proceed without undue interruptions. Such fine-tuning, if to be performed manually, may require a certain level of expertise on the part of a user with respect to security configurations. In order to address a situation where certain security restrictions may prevent correct functioning of a workflow, the training mode proposed herein may permit a workflow to proceed without any security restrictions being enforced, while recording every instance where the workflow would trigger a security restriction but for the training mode being active. These instances where the workflow would trigger a security restriction, referred to as "chokepoints," may be recorded and used to automatically update security configuration scheme for that computing application or the associated computer system.

For example, a viewing application designed to manipulate and share electronic documents, e.g., ADOBE® ACROBAT® or ADOBE® READER®, may be configured with security settings that restrict access to any server that is outside of a certain IP address range. A mission critical workflow may require access to one or more of such servers. While it may be challenging for a user to manually edit the security configuration file, the training mode feature allows a user to run the viewing application without any security restrictions being imposed on the workflow, after which the security configuration scheme is updated based on data collected while the viewing application was run in the training mode. The updated security configuration scheme would override only those restrictions that may interfere with correct functioning of the workflow.

The training mode may be triggered by a user explicitly or based on a predetermined sequence of events with respect to the computing application and may be deactivated automatically or in response to a request from a user. In one example embodiment, a user may be presented with a visual indication of a training mode being active in order to alert the user to the fact that the current security restrictions have been temporarily overridden.

This solution, in one example embodiment, allows very targeted removals of security restrictions with the minimum requirement of expertise on the part of a user with respect to the intricacies of configuration settings. It also eliminates the need to communicate the very complex nature of various security restrictions that they may wish to override. The techniques described herein may also be applied to automatically update configuration schemes other than a security configuration scheme, such as, e.g., a configuration scheme that controls presentation of a user interface on a display device. For example, a training mode may be activated in order to determine what tools are being invoked by a user in the course of running a certain computing application and to automatically update a toolbar associated with the computing application to make these tools more accessible to the user, e.g., after the training mode has been deactivated.

Example method and system to automatically update a configuration scheme may be described with reference to a network environment illustrated in FIG. 1. FIG. 1 shows an example network environment 100, within which a system to automatically update configuration settings based on monitored operations performed by a computing application may be implemented. The network environment 100 may include one or more computer systems, such as a computer system 110, and one or more server systems, such as a server system 120 and a server system 140. The computer system 110 and the server systems 120 and 140 may be in communication with each other via a network 130. The communications network 130 may be a public network (e.g., the Internet, a wireless network, a public switched telephone network (PSTN), etc.) or a private network (e.g., LAN, WAN, Intranet, etc.).

As shown in FIG. 1, the computer system 110 hosts a computing application 112. The computing application 112 may be, e.g., a document viewing application, such as, e.g., ADOBE® READER®, a business application, or any other computing application that may benefit from a customizable configuration scheme. The computing application 112 is shown with an associated configuration scheme 113. In one example embodiment, the configuration scheme 113 may be, e.g., a security configuration scheme.

The computer system 110 is shown as hosting a configuration update system 114 adapted to automatically update the configuration scheme 113. The configuration update system 114 may be implemented as part of the computing application 112 or, in some embodiments, as a stand-alone module configured to cooperate with the computing application 112. An example system to automatically update configuration settings based on monitored operations, e.g., operations caused by activities of a user with respect to a computing application, may be discussed with reference to FIG. 2.

Figure 2:
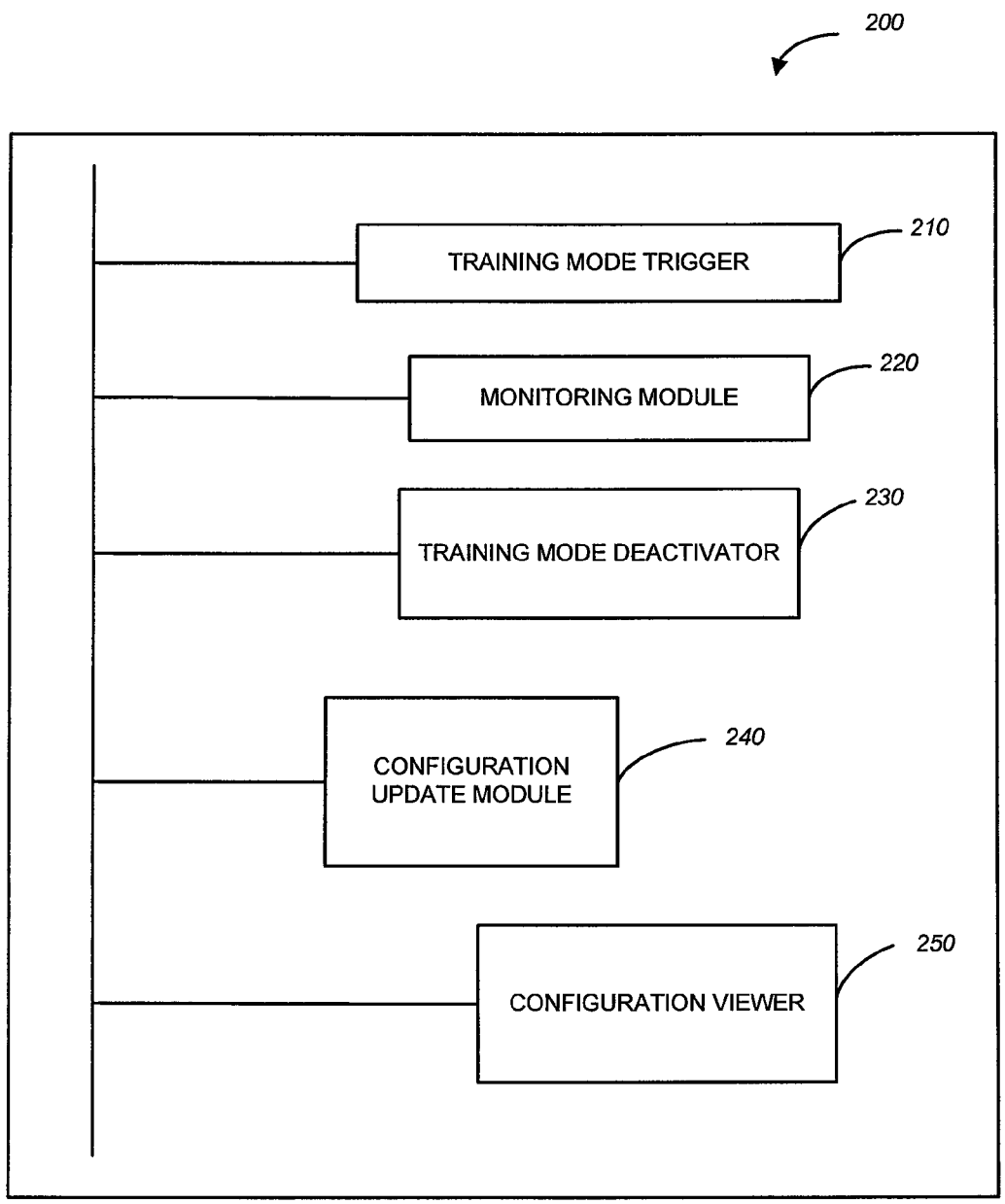
FIG. 2 is a block diagram illustrating a system to automatically update a configuration scheme, in accordance with an example embodiment.

FIG. 2 shows a block diagram illustrating a system 200 to automatically update configuration settings, according to one example embodiment. As shown in FIG. 2, the system 200 includes a training mode trigger 210, a monitoring module 220, a training mode deactivator 230, and a configuration update module 240. The system 200, in one example embodiment, corresponds to the configuration update system 114 illustrated in FIG. 1.

The training mode trigger 210 may be configured to activate a training mode that triggers monitoring of events associated with the computer application 112. The training mode, as discussed in further detail below, may allow unrestricted access to network entities that may be otherwise unavailable to the computing application 112. In another embodiment, the training mode may result in collecting data associated with activities of a user, which data may be then used in order to configure a customized presentation of a toolbar associated with the computing application 112.

The monitoring module 220, in one example embodiment, may be configured to monitor operations or events that invoke or are associated with a configuration scheme. For example, certain operations performed by a computer application may invoke a security configuration scheme. The monitoring module 220 may be configured to keep track of such operations and the context within which such operations were requested. The monitoring module 220 may also record and store the monitored events and the associated context in a training log in order to permit automatic update of the configuration scheme based on this information. The training mode deactivator 230 may be configured to deactivate the training mode and the associated monitoring by the monitoring module 220.

The configuration update module 240 may be configured to update the configuration scheme based on the monitored operations that may be reflected in a training log. The system 200 may also include a configuration viewer 250. The configuration viewer 250 may be configured to permit a user to view configuration settings.

In scenarios that involve configuring a security configuration scheme, utilizing the system 200 may allow a user to switch into an entirely insecure mode where the monitoring module 220 gathers information regarding any operations performed in the course of a workflow that may pose a security threat and record them together with the associated context (e.g., the location of the electronic document that requests the operation to be performed). After the training mode is activated, one or more users may continue with workflow as normal. Because the training mode, in one example embodiment, causes removal of all security restrictions, the workflow would not be interrupted when a chokepoint present in the security model is encountered. Whenever an operation that would have been prevented by the security configuration scheme but for the training mode being enabled, an entry may be created in a training log that may be later used to update the security configuration scheme by permitting those previously restricted operations that are indicated in the training log as having been used in the course of the workflow. Disabling one or more chokepoints in a security model may be referred to as security reductions. Specific and targeted security reductions required for the workflow to function correctly (e.g., without interruptions to obtain a confirmation from a user) may be then either applied to local preferences (e.g., stored at the computer system 110 of FIG. 1) or set up to be pushed out to an enterprise (e.g., to an application or service running on the server system 120 of FIG. 1).

An approach where a training mode is utilized to collect data needed for fine-tuning security configuration settings may require minimal amount of manual configuration of security settings to be performed by a user. On the other hand, customizing security setting, e.g., to be adapted for specific workflows, may contribute to leaving as few security holes open as possible. Various operations performed by the system 200, according to an example embodiment, may be discussed with reference to FIG. 3.

Figure 3:
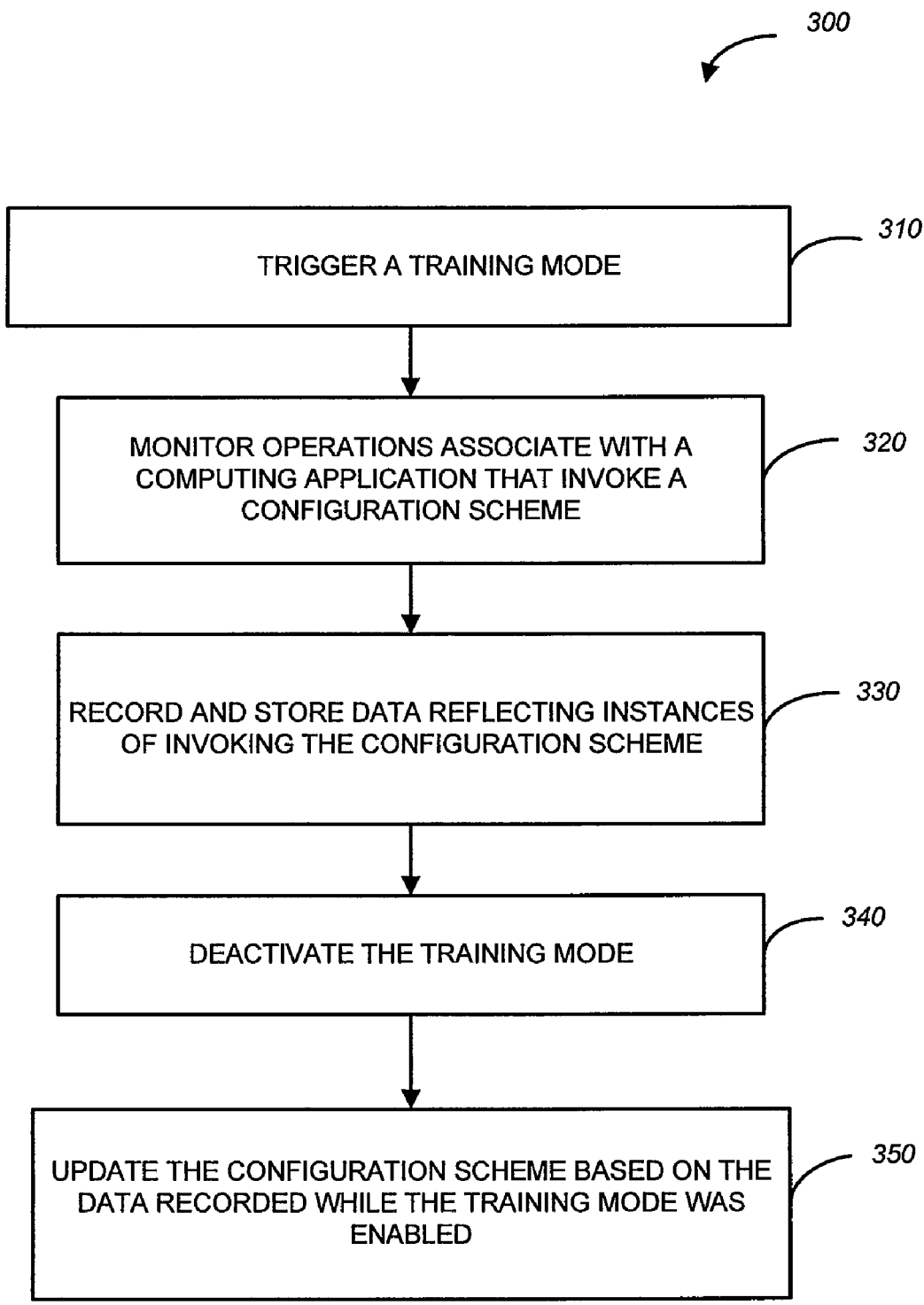
FIG. 3 is a flow chart illustrating a method system to automatically update a configuration scheme, in accordance with an example embodiment.

FIG. 3 is a flow chart illustrating a method 300 to automatically update configuration settings based on monitored operations with respect to a computing application, in accordance with an example embodiment. The method 300 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2. The modules illustrated in FIG. 2 may be implemented as software, hardware, or a combination of both.

As shown in FIG. 3, the method 300 commences with operation 310, where the training mode trigger 210 of FIG. 2 triggers the training mode, which may occur, e.g., in response to detecting that a certain workflow is in progress or in response to an explicit instruction from a user. At operation 320, the monitoring module monitors operations associated with the computer application 120 of FIG. 1 that invoke the configuration scheme 113 of FIG. 1. Monitored data reflecting instances of invoking the configuration scheme 113 is recorded and stored (e.g., in a training log) at operation 330. The training mode is deactivated at operation 340, e.g., in response to the completion of a workflow. At operation 350, the configuration scheme 113 is updated based on data recorded in the training log.

One example of using a method to automatically update configuration settings based on data collected while a computer system is operating in a training mode is provided below. While the example scenario described below relates to configuring security settings in the context of a viewer application, the method and system described herein may be used beneficially with respect to other configuration schemes, as explained above.

As mentioned above, most users are not able to make appropriate security decisions for themselves because these types of decisions may require extensive technical expertise. On the other hand, it may be difficult for even the most sophisticated user to configure security chokepoints appropriately to achieve the balance of re-enabling workflows only for trusted electronic documents presented in a portable document format (PDF).

In a hypothetical scenario, ACME Corporation may have a number of workflows based on ADOBE® READER®. ACME's Information Technologies (IT) Administrator, Samantha, may download ADOBE® READER® and start testing ACME's purchase orders workflow. First, Samantha starts the process of filling out a test purchase orders form and submitting it. When she pushes the "SUBMIT" button, Samantha is presented with a user interface (UI), e.g., a pop-up window with a selection button, indicating that her workflow has encountered a security chokepoint. Samantha clicks on the selection button and is presented with an exact description of what the security chokepoint is. Samantha is also presented with some options, one of which is an option to invoke the training mode. Samantha selects to start the training mode.

The first thing that happens in the training mode, according to one example embodiment, is the UI changes visual appearance to indicate that a potentially dangerous operation is being requested and thus the user is to proceed with caution, which may be indicated using visual clues, such as, e.g., a change in the color scheme for the ADOBE® READER® or an certain image that conveys a warning. Next, Samantha is presented with a dialog about the training mode, warning her to use this mode only to configure certain workflows and to turn it off as soon as they have been completed. At this point, Samantha is presented with an option to invoke the training mode. Samantha chooses to proceed, and is instructed to run her workflow and then to turn off the training mode as soon as the workflow is completed. In one example embodiment, a user may be prompted for a confirmation each time the workflow encounters a security chokepoint. Samantha runs ACME's purchase orders workflow again. While she does this, the training mode causes the ADOBE® READER® to act as if this is a trusted workflow already. The training mode is, however, recording the security chokepoints encountered, together with domain information and certificate information (if any) for each chokepoint.

Once Samantha finishes the purchase orders workflow, she selects to turn off training mode to stop the recording process. When the training mode is turned off by Samantha, she is presented with a list of security chokepoints that may be disabled as a result of updating the existing security model based on data collected in the training mode, as well as the very specific circumstances (e.g., based on domain, local file, and certificate) causing these chokepoint to be disabled. At this point, Samantha will have the option to cancel or proceed. Samantha chooses to proceed.

Samantha is now at the last stage of the training mode. Here her choices are to configure the local user, configure the local machine, and/or output a file that can be used as input to another computing application. For example, data collected in the training mode may be used as input to a customizable installation application in order to modify any default security settings when ADOBE® READER® is being installed. Samantha chooses to configure her machine, and to output a file for the Installer Wizard. Samantha is presented with her choices and, in the final step, she selects the "PROCEED" option presented to her. In one example embodiment, this is the last step before training mode exits. The training mode will then configure the specific security chokepoints that need to be disabled for the specific circumstances for this user (Samantha) on the local machine.

In one embodiment, the training mode may also output a training mode file (e.g., a training log) to be used later, e.g., when constructing a customer installer for ACME corporation. Samantha emails the training log to her colleague Tom who is using the Install Wizard to create a customer installer for ADOBE® READER® for ACME Corporation. It will be noted, that the hypothetical scenario described above is provided to illustrate one possible use case for the method and system to automatically update or fine-tune a configuration scheme and does not represent a limitation with respect to other scenarios where it may be desirable to use a customizable configuration model.

Figure 4:
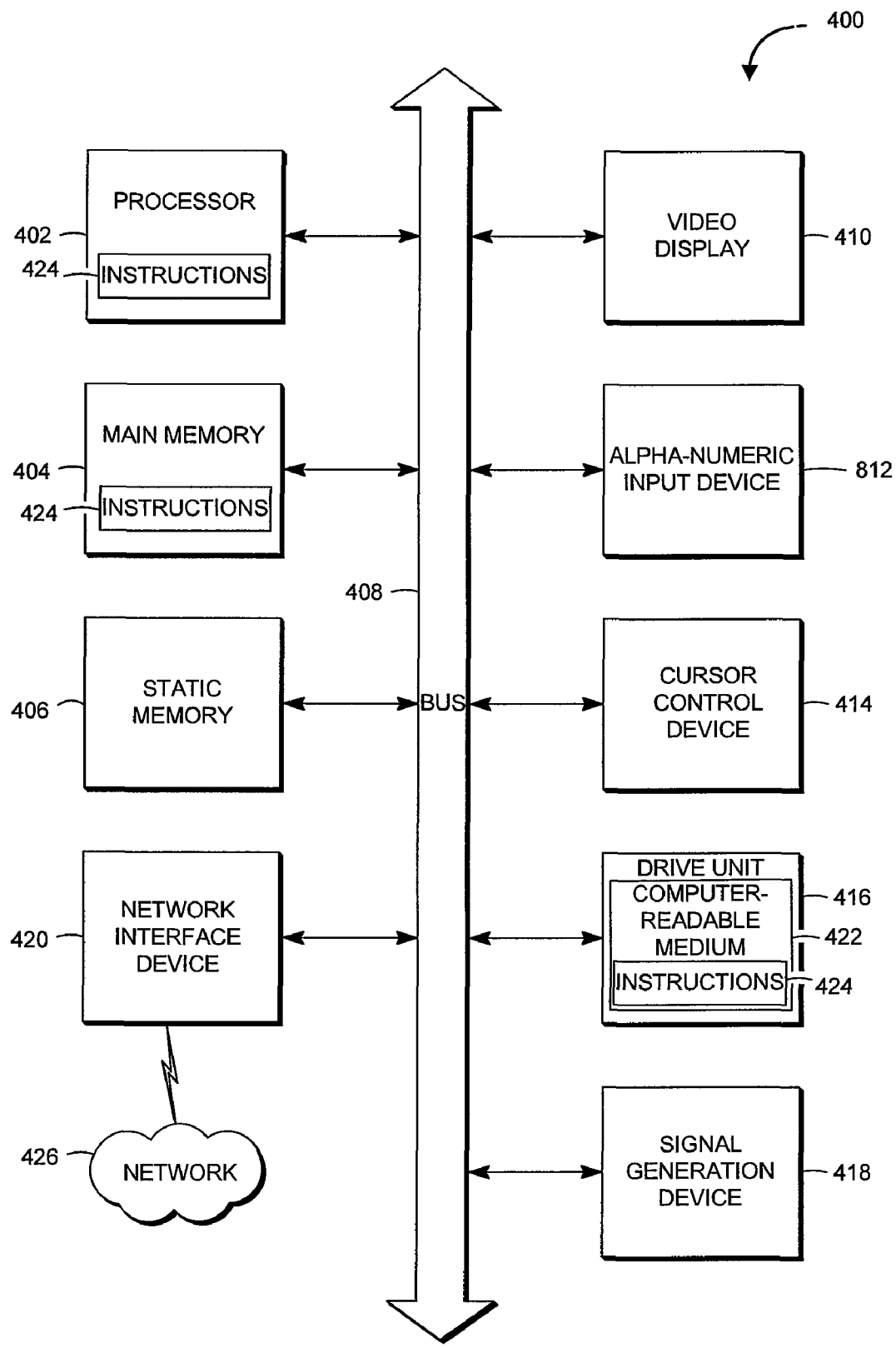
FIG. 4 is a diagrammatic representation of a machine in the example form of a computer system within which a set of instructions, for causing the machine to perform any one or more of the methodologies discussed herein, may be executed.

FIG. 4 is a diagrammatic representation of a machine in the example electronic form of a computer system 400 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a computer-readable (or machine-readable) medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to automatically update configuration settings based on monitored activities of a user have been described. The techniques described herein may be adapted for auto-configuration of security reductions to maintain workflow compatibility. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
using one or more processors to perform operations of:
monitoring one or more operations that override a restriction in a security configuration scheme, the security configuration scheme being stored at a computer system; and
automatically updating the security configuration scheme based on the one or more monitored operations.

2. The method of claim 1, comprising triggering a training mode, wherein the monitoring is in response to the triggering of the training mode.

3. The method of claim 2, wherein the triggering of the training mode comprises receiving a request from a user in response to a user interface being presented to the user, the user interface to provide information about automatically updating the security configuration scheme.

4. The method of claim 2, comprising deactivating the training mode, wherein the updating of the security configuration scheme is in response to the deactivating of the training mode.

5. The method of claim 1, comprising generating a training log of the monitored operations, wherein the updating of the security configuration scheme is based on the training log.

6. The method of claim 1, comprising:
detecting an operation that triggers a security restriction associated with the security configuration scheme;
overriding the security restriction;
recording, in a training log, context information associated with the overriding of the security restriction,
wherein the updating of the security configuration scheme comprises updating the security configuration scheme based on data recorded in the training log.

7. The method of claim 1, wherein the security configuration scheme is associated with security settings for a document viewing application.

8. The method of claim 7, wherein the document viewing application is to present electronic documents in a portable document format (PDF).

9. The method of claim 1, wherein:
the monitoring of operations that invoke the security configuration scheme is to be performed on a first physical computing device; and
the updating of the security configuration scheme is to be performed on a second physical computing device.

10. A method comprising:
executing instructions on a specific apparatus that result in digital electronic signal implementation of a process in which one or more operations that override a restriction in a security configuration scheme are monitored, the security configuration scheme being represented by digital electronic signals and stored in a memory location of said specific apparatus; and executing instructions on a specific apparatus that result in updating the security configuration scheme based on the one or more monitored operations.

11. A computer-implemented system comprising:

a monitoring module to monitor one or more operations that override a restriction in a security configuration scheme, the security configuration scheme being stored at a computer system; and a configuration update module to update the security configuration scheme based on the one or more monitored operations.

12. The system of claim 11, comprising a training mode trigger to activate a training mode, wherein the monitoring module is to monitor operations that invoke a security configuration scheme while the training mode is activated.

13. The system of claim 12, wherein the training mode trigger is to receive a request from a user in response to a user interface being presented to the user, the user interface to provide information about automatically updating the security configuration scheme.

14. The system of claim 12, comprising a training mode deactivator to deactivate the training mode, wherein the configuration update module is to update the security configuration scheme in response to the deactivating of the training mode.

15. The system of claim 11, wherein:

the monitoring module is to generate a training log of the monitored operations; and the configuration update module is to update the security configuration scheme based on the training log.

16. The system of claim 11, wherein:

the monitoring module is to:

detect an operation that triggers a security restriction associated with the security configuration scheme, override the security restriction, and record, in a training log, context information associated with the overriding of the security restriction of the overriding of the security restriction in a training log; and the configuration update module is to update the security configuration scheme based on data recorded in the training log.

17. The system of claim 16, wherein the context comprises location of an electronic document that requests the overriding of the security restriction.

18. The system of claim 11, wherein the security configuration scheme is associated with security settings for a document viewing application.

19. The system of claim 17, wherein the document viewing application is to present electronic documents in a portable document format (PDF).

20. A machine-readable non-transitory storage medium having instruction data to cause a machine to:

monitor one or more operations that override a restriction in a security configuration scheme, the security configuration scheme being stored at a computer system; and update the security configuration scheme based on the one or more monitored operations.

* * * * *